United States Patent [19]

Byrne et al.

[11] Patent Number: 5,990,883
[45] Date of Patent: Nov. 23, 1999

[54] UNIFIED PRESENTATION OF PROGRAMMING FROM DIFFERENT PHYSICAL SOURCES

[75] Inventors: David S. Byrne, Seattle; Sean McDowell, Redmond, both of Wash.

[73] Assignee: Microsoft Corporation, Redmond, Wash.

[21] Appl. No.: 08/848,537

[22] Filed: Apr. 28, 1997

[51] Int. Cl.[6] .................................................. G06F 13/00
[52] U.S. Cl. ........................................... 345/327; 345/352
[58] Field of Search .................................... 345/327, 326, 345/328, 330, 331, 332, 340, 342, 345, 346, 348, 350, 351, 352, 353, 354, 200.33; 348/563–565, 553; 395/200.47; 455/2

[56] References Cited

U.S. PATENT DOCUMENTS

| | | | |
|---|---|---|---|
| 5,528,304 | 6/1996 | Cherrick et al. | 348/565 |
| 5,635,989 | 6/1997 | Rothmuller | 348/563 |
| 5,701,451 | 12/1997 | Rogers et al. | 395/600 |
| 5,721,827 | 2/1998 | Logan et al. | 395/200.47 |
| 5,732,216 | 3/1998 | Logan et al. | 395/200.33 |
| 5,758,257 | 5/1998 | Herz et al. | 455/2 |
| 5,774,664 | 6/1998 | Hidary et al. | 395/200.48 |
| 5,790,202 | 8/1998 | Kummer et al. | 348/553 |
| 5,797,001 | 8/1998 | Augenbraun et al. | 395/609 |
| 5,848,352 | 12/1998 | Dougherty et al. | 455/5.1 |

*Primary Examiner*—Steven P Sax
*Attorney, Agent, or Firm*—Lee & Hayes, PLLC

[57] ABSTRACT

Disclosed herein is a system and method for selecting content from a plurality of different physical sources and from a variety of content sources that are available from the physical sources. In one example, physical sources comprise different signal sources or types, such as terrestrially broadcast signals and cable television signals. Content sources comprise different channels or network sources. The method includes a step of displaying an integrated listing of content entries for selection by a user, wherein each content entry is associated with both a content source and a physical source from which particular content is available. The system accepts a selection from the user of a single content entry, and in response renders the content source associated with the selected single content entry from the physical source that is also associated with the selected single content entry. The invention also includes steps of obtaining content data for a plurality of different content sources in a variety of data formats, and of translating the content data into an integrated database having a predefined schema.

41 Claims, 2 Drawing Sheets

— 50

| CABLE | NBC | 5 | TWO IS PLENTY | 7:30 PM |
|---|---|---|---|---|
| ANT | FOX | 14 | GRAPES OF WRATH | 7:30 PM |
| CABLE | E! | 14 | EMERGENCY | 8:00 PM |
| ANT | NBC | 2 | TWO IS PLENTY | 8:00 PM |
| CABLE | HIST | 8 | THE FACT FINDERS | 9:00 PM |
| ANT | ABC | 10 | SPOTLIGHT | 9:30 PM |
| INT | MSNBC | MSNBC.COM | COMMENTARY | 9:30 PM |

*Fig. 3*

UNIFIED PRESENTATION OF PROGRAMMING FROM DIFFERENT PHYSICAL SOURCES

TECHNICAL FIELD

This invention relates to automated program guides and to methods of presenting programming information within automated program guides.

BACKGROUND OF THE INVENTION

It has become common for a single video, audio, or data device to receive multimedia program content from a variety of physical sources. For instance, a television is easily configured to receive programming from one or more cable systems and also from terrestrial broadcast systems. More recent devices such as set-top boxes (STBs) and multimedia personal computers (PCs) are able to receive programming from cable systems, terrestrial broadcast systems, the Internet, video tape players, digitized video libraries, CD-ROMs, and so on.

The large number of available program sources has produced a correspondingly large amount of programming, making it difficult for users to find and select desired programming. Traditional printed directories and program guides cannot easily handle the large amounts of information that must be presented to potential consumers of programming.

Electronic program guides (EPGs) are sometimes available for particular physical program sources. An EPG typically lists program content that is available from a particular physical source, in a way that allows a user to interactively locate specific content. For example, an EPG might include the starting and ending times for a particular show, the title of the show, the general topic or genre of the show, the primary actors or personalities involved in the show, and other information. The information is presented interactively, so that the user can scroll through various content entries and even perform searches based on criteria supplied by the user.

EPGs utilize databases containing programming information for particular broadcast systems. Such databases are typically compiled and provided by entities associated with a particular physical program source. For example, a cable distribution network might make available a database containing details about programming that is available from that distribution network. In some cases, third parties might compile databases for terrestrial or cable broadcast content in a particular geographic area. Each database is typically formatted IN a proprietary way, so that the EPG must be customized to deal with the format of each particular database.

While there is an abundance of available program content and descriptive information regarding such content, there is still no convenient way for a user to review and select content from a variety of physical sources. Suppose, for example, that a user has a receiving device connected to receive content from a television antenna and from a cable network. The user might subscribe to an EPG service for terrestrially broadcast television content in the user's geographic area. This EPG might run on a PC or some device external to the user's television receiver. Similarly, the cable network might supply an EPG of cable programming, which would run on the network-supplied STB.

In this example, the user would be forced to use two different EPGs to survey all possible programming choices. In addition, there the user would have to manually switch his or her receiver between the television antenna and the cable network depending on the source of the desired programming. This requires much more effort by the user than should be necessary.

SUMMARY OF THE INVENTION

The invention includes steps of gathering programming data for a plurality of different program environments, in a variety of different data formats, and integrating this data into a single database having a predefined schema. Information is presented to the user in an EPG, with program content for all of the different program environments integrated in a single listing. The user can select a single entry, and a system in accordance with the invention automatically tunes to the selected programming, without requiring the user to take any further action.

BRIEF DESCRIPTION OF THE DRAWINGS

FIG. 3 shows an example of an integrated program listing in accordance with the invention.

DETAILED DESCRIPTION OF THE PREFERRED EMBODIMENT

Figure 1:
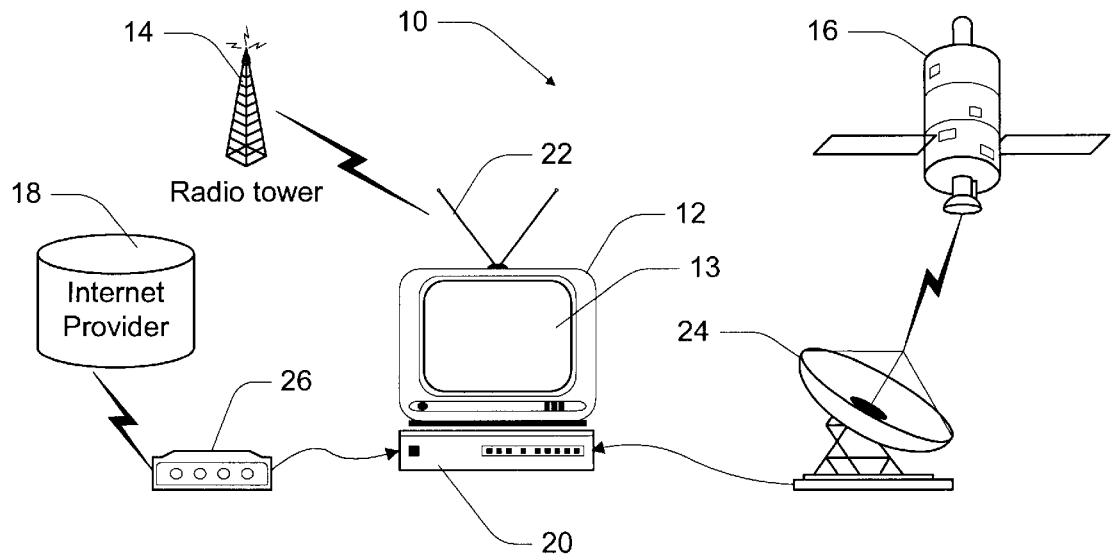
FIG. 1 is a diagram of an entertainment system in accordance with an embodiment of the invention.

FIG. 1 shows an interactive entertainment distribution and viewing system 10 in accordance with one embodiment of the invention. Entertainment system 10 includes a video and audio rendering system 12 that preferably comprises a traditional television receiver or video monitor including a viewing area 13. Receiver 12 is connected to receive and render content from a plurality of different physical signal sources and from a variety of different content sources that are available from the physical signal sources.

While audio and video have traditionally been transmitted over the airwaves, current and proposed technology allows multimedia content transmission over different types of cable and satellite systems, employing both analog and digital transmission formats. Video images are also available from local, in-home sources such as video cassette recorders and local computer storage. Audio content is similarly available from home storage devices such as CD-ROMs and cassette tapes. Each of these media and devices are considered different physical signal sources for purposes of this description.

FIG. 1 shows several different physical sources of programming, including a terrestrial television broadcasting system 14, a satellite broadcasting system 16, and an Internet provider 18 from which audio and video are available. Other physical sources might be used in different situations, including hardwired cable systems and interactive television systems. A local device such as a hard disk drive or an audio CD-ROM player might also be a physical source of multimedia content such as audio or video content.

In many cases, each physical signal source might comprise or correspond to a different physical receiving apparatus—such as a satellite receiver, cable tuner, radio, etc. In other cases, a particular receiving apparatus or storage medium might be considered a physical signal source. For example, individual audio tapes or CDs might each be considered individual physical sources. In still other cases, the different physical sources might comprise different transmission or reception media—such as antennas for receiving terrestrial broadcasts, subscription television cables that carry cable television signals, optical media, etc.

Each of these physical sources broadcasts or otherwise provides a plurality of content sources. The most familiar example of a content source is a traditional RF television broadcast channel, which is typically occupied by a particular broadcast network such as ABC, CBS, NBC, etc. In the last several years, a great number of such broadcast networks have become available through cable television providers. Each of these broadcast content sources is associated with a particular broadcast channel, which in turn is identified by a channel number. Users become familiar with the channel designations for various content sources, and often refer to the content sources by their channel numbers, although the correspondence between content sources and channel numbers changes depending on the physical source being used-upon the geographic location and/or the service provider. In addition, broadcast channels having the same channel indicators are available from different physical signal sources. For example, channel 2 might be available from both a terrestrial broadcast signal and from a cable signal, even though channel 2 might correspond to a different network or content source in each case.

Different types of physical sources might have different types of content sources. A CD, for example, has a plurality of tracks, each of which is considered to be a content source.

Entertainment system 10 includes a set-top box (STB) or user interface unit 20 connected for operation in conjunction with or as an integrated part of receiver 12. Set-top box 20 performs the functions of a conventional unit of this nature, such as controlling channel selection and decoding premium broadcast channels. One purpose of STB 20 is to receive broadcast audio and video signals and images from different broadcasters and to display said signals or images on viewing area 13 of receiver 12. In this example, STB 20 also selects from different available physical sources. Thus, STB 20 has interfaces that connect to an RF antenna 22 for receiving terrestrial broadcasts, to a satellite dish antenna 24 for receiving satellite broadcasts, and to a modem 26 for communicating with an Internet provider and to receive Internet content.

Figure 2:
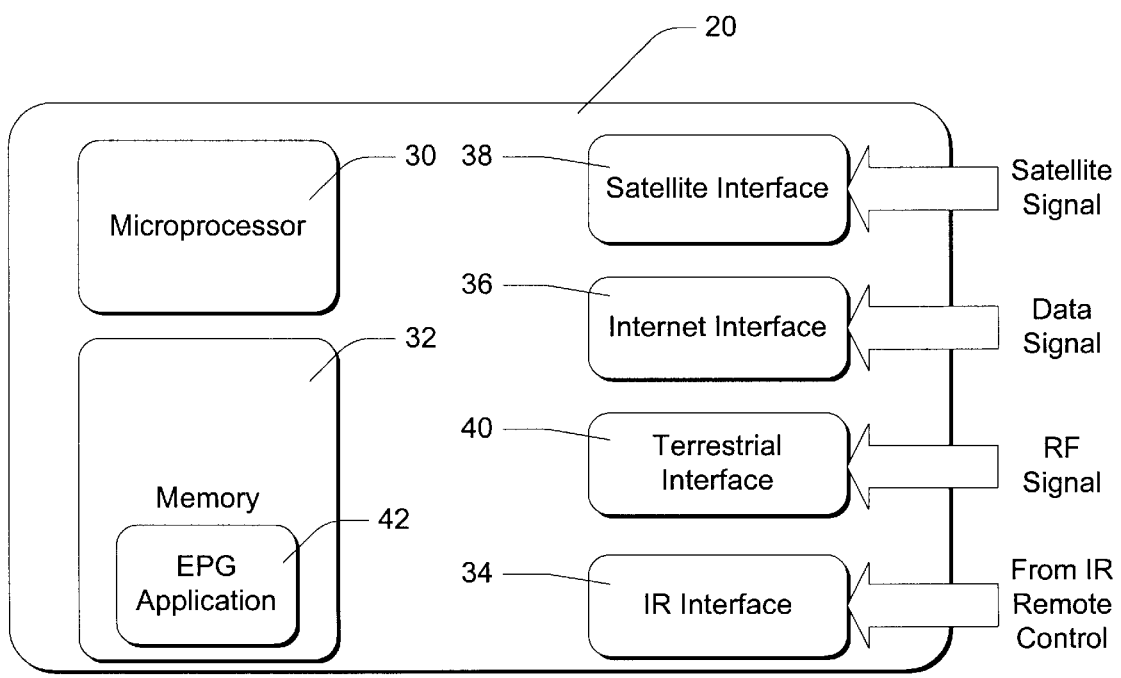
FIG. 2 is a block diagram of a set top box (STB) in accordance with the embodiment of FIG. 1.

FIG. 2 shows relevant components of STB 20 in accordance with one embodiment of the invention. While STB 20 is shown as a discrete component, it might alternatively be built into a television receiver or other video display device. It could similarly comprise a multimedia computer designed for consumer use.

STB 20 includes logic hardware in the form of a microprocessor 30 and associated storage memory 32. Memory 32 includes electronic, randomly accessible memory, and might also include disk-based memory or other similar types of storage. STB 20 also includes an infra-red (IR) receiver 34 for receiving commands from a remote control handset (not shown), a data or Internet interface 36 for exchanging data with Internet provider 18, a satellite interface 38 for receiving satellite video, and antenna interface 40 for receiving terrestrially broadcast television signals. Data processor 30 is connected to receive commands from IR receiver 34 and to also communicate with the other interfaces. The remote control handset of the STB works in conjunction with the STB to allow a viewer to give various commands to the STB.

A video entertainment system in accordance with the invention includes an interactive application 42, referred to herein as an automated program guide and also commonly referred to as an electronic program guide or EPG. Automated program guide 42 executes on data processor 30 from memory 32. The automated program guide has various facilities that work in conjunction with video receiver 12 for assisting a user in locating and selecting audio and/or video content from all available physical sources. In its simplest embodiment, the automated program guide presents a categorized list of content entries, each corresponding to particular audio or video content. The entries might be categorized or sorted by broadcast time and content source. In more sophisticated embodiments, the entries might optionally be categorized by subject matter, length, or other selectable attributes. Each entry identifies both a physical signal source and a content source that is available from that physical signal source. Generally, physical sources are identified by physical source identifiers and content sources are identified by content source identifiers, which will be described below.

In contrast to the prior art, automated program guide 42 is configured to display an integrated listing of program or content entries that are available from at least a plurality of the physical sources and their content sources. Specifically, content from a plurality of available physical sources is merged and displayed together, based upon a categorization that can be selected by the user (the categorization being limited by the capabilities and sophistication of the automated program guide).

FIG. 3 shows a simple example of such an integrated listing, generally designated by reference numeral 50. Listing 50 has a plurality of rows, each of which corresponds to particular content available from one of the physical sources and one of the content sources. In this simple example, the first column identifies a physical signal source; the second column identifies a content source that is available from the physical signal source; the third column indicates the channel number corresponding to the content source in the context of the indicated physical signal source; the fourth column shows the name of the content or program; and the fourth column shows the starting time for the content, if applicable. The user can scroll through a plurality of rows to review additional programming choices.

Taking the first row as a particular example, it lists programming content that is available from a cable distribution network on the NBC network or channel 5, having the title "Two is Plenty", starting at 7:30 PM. Another entry, in the fourth row, lists this same content at a different time. In this case, the content is available from the antenna signal source rather than the cable signal source. The content source is the same—NBC—although it is provided from a different physical source. The channels numbers in this instance are different.

In the example shown in FIG. 3, the physical source identifiers are names describing particular physical receiving media, such as "ANT" for antenna, "CABLE" for a cable television source, and "INT" for an Internet source. Content source identifiers are alphabetic monikers associated with cable and television networks and corresponding channels indicators or numbers. For Internet entries, channel numbers are replaced by URL designators. Similarly to the actual example of FIG. 3, the same channel numbers might be available from different signal sources.

Where a physical signal source is a non-broadcast source, such as a local audio track player, individual content within the physical source can be identified by sequence or track number, or by the titles of individual tracks.

FIG. 3 is merely an example of an integrated listing in accordance with the invention. More sophisticated listings can of course be compiled.

In addition to presenting an integrated listing of content entries for selection by user, automated program guide 42 is configured to accept a selection from the user of a single content entry and in response to present or render content from the physical source and content source identified by the selected source entry. The user selects an entry by moving an on-screen cursor or pointer to the desired selection with the infrared remote control device and then pushing an "action" button on the remote control device. If using a more general-purpose computer, the user would move a cursor using a mouse or keys on a keyboard, and would then either click the mouse or press an action key such as the "enter" key on the keyboard.

Rendering the selected content in many cases will involve actually tuning the video receiver to the signal source and the content source identified by the selected content entry. In other cases, rendering might involve issuing instructions from one component to another. In the embodiment shown in FIG. 2, the STB switches to the appropriate interface and then tunes that interface to the appropriate channel. In digital receivers such as many newer satellite receivers, tuning might entail tuning an RF receiver to a particular frequency. However, tuning might also be accomplished in a logical sense by selecting a stream of like-designated packets from a broadcast of many such streams. When the Internet is a content source, the rendering of content might comprise launching an Internet browser and specifying a particular URL or IP multicast address (uniform resource locator) for viewing.

Note that the user simply selects a single content entry or listing, and does not need to be concerned with the physical source that supplies the listed content. In response to the selection, the system automatically takes whatever steps are necessary to configure receiving equipment for the appropriate physical signal source, and also tunes or selects within that signal source to render the selected content. In many cases, it might not even be necessary for the automated program guide to list the physical signal source.

Internally, the system associates each physical signal source with a "tuning space." A single tuning space contains a set of channels or other content sources, each of which is unambiguously identified only within that tuning space. Any physical source and content source combination can be unambiguously identified by its tuning space and its channel indicator or number within that tuning space.

The EPG system can obtain program information from various suppliers in various formats. Often, program information is supplied over the same medium as the programming itself. For example, a satellite service provider may supply program guide data over one of the satellite channels. However, program information can also be supplied over a different medium—a local cable operator may supply program guide data through a vendor who sells subscriptions to program guides downloaded from the Internet on a nightly basis. The satellite program data may be received as data packets from the satellite while the cable program data may be received as a downloaded file.

To integrate programming information for different tuning spaces, is translation filters are used by the EPG for each program guide source. EPG database loaders, corresponding respectively to tuning spaces, utilize one or more translation filters to process data for corresponding program content sources and for inserting the data into a local database. The translation filters convert information into a common schema based on a canonical program guide or database definition. The filters can be created taking into account program guide source assumptions and defaults, thereby adding information to the displayed program guide that is not explicitly included, but still needed to provide a complete description of the programs and tuning requirements when compared to other programs and content from other sources. Though it may be necessary to add, extract, and associate specific tuning information with the program descriptions, such as what frequency or satellite transponder a program is on, it is not necessary to provide this level of detail to the user.

Note that the database loaders and translation filters might be utilized by the EPG itself to create a local database in a standard format, or might be implemented at some central location to create a central database in the standard format. The preferred embodiment of the invention uses a relational database schema that is complete enough to cover all necessary and desirable program guide information, flexible enough to respond to changes such as additional types of program descriptive information, and efficient enough to allow rapid display, searching, and other tuning and viewing-related user control. While many different schemata are possible, the following is a description of a preliminary schema for use in an exemplary embodiment of the invention. The schema is for use in conjunction with a relational database, and thus includes a plurality of related tables. The following table briefly describes the tables of the schema:

| Table | Description |
| --- | --- |
| Network | Defines various broadcast networks, such as ABC, CBS, NBC, etc. |
| Station | Defines individual broadcast providers. |
| Channel | Defines all tunable channels and properties for each tuning space. |
| Episode | Describes each television program episode. |
| Time Slot | Defines time slot and channel information for each episode. |
| Rating | Defines rating names for individual ratings used in various rating systems. |
| Rating System | Provides names for MPAA style names. |
| Genre | Provides names for categories of episodes. |
| Sub-Genre | Provides names for sub-categories within a genre. |
| Broadcast Property | Gives names for various broadcast properties, such as closed-captioning. |
| Episode Property | Specifies properties associated with individual episodes. |
| Channel Property | Specifies properties associated with individual channels. |
| Stream Type | Gives names for all data streams available on a specific channel. |
| Channel Stream | Lists the data streams available on a specific channel. |

For improved performance and ease of navigation, many of these tables are referentially linked with an automatically generated counter.

The fields of the individual tables are described below. In the tables that describe the fields, keys are identified as follows:

P=Physical primary key used for navigation and referential integrity rule definition;

F=Foreign key (identifier to an external item or other table);

E=Externally persistent key (logical primary key).

The Network Table

The Network table in the EPG database defines information about various broadcast networks. The following table describes the fields in the Network table:

| Field | Key | Index | Type | Description |
|---|---|---|---|---|
| Network ID | P | Yes | Counter | Internally generated unique identifier for this network. |
| Name | E | Yes | Text | Name of this network. |
| LogoMoniker | | No | Text | Name of file containing the logo for this network. |

The Station Table

The Station table in the EPG database defines individual broadcast providers. The following table describes the fields in the Station table:

| Field | Key | Index | Type | Description |
|---|---|---|---|---|
| Station ID | P | Yes | Counter | Internally generated unique identifier for this station. |
| Call Letters | E | Yes | Text | Call letters of this station (HBOW, etc). |
| Name | | No | Text | Name of this station (Home Box Office West, etc). |
| Network ID | F | No | Integer | Foreign key to Network table. |
| Description | | No | Memo | Extended description of programming provided by this station. |
| Logo | | No | Text | Name of file containing the logo bitmap for this station. |

The Channel Table

The Channel table in the EPG database defines all tunable channels and properties for each tuning space. The following table describes the fields in the Channel table:

| Field | Key | Index | Type | Description |
|---|---|---|---|---|
| Channel ID | P | Yes | Counter | Internally generated unique identifier for this channel. |
| Tuning Space | EF | Yes | Integer | Logical ID of the physical network type (broadcast tuner, satellite, etc). |
| Channel Number | E | No | Integer | Tuning ID for the channel's input stream. |
| Start Time | E | No | Date/Time | Time when this channel becomes available on the network. |
| End Time | | No | Date/Time | Time when this channel becomes unavailable on the network. |
| Length | | No | Integer | Length of channel in minutes. Useful when channels are available during certain times. |
| Station ID | F | Yes | Counter | Station mapped to this channel during the specified time period. |
| Description | | No | Memo | Extended description of this channel. |
| Attachment | | No | Memo | URL or application associated with this channel. |
| Rating ID | F | Yes | Integer | Foreign key to the Rating table. |
| Display Mask | | No | Integer | Bitmask used with the conditional access mask to determine whether or not to display this channel. |
| Payment Address | | No | Integer | Address used to find pay-per-view information for this channel. Used with Payment Token to subscribe to the channel. |
| Payment Token | | No | Integer | Pay-per-view ID passed to the conditional access server to subscribe to this channel. |
| Last Update | | No | Date/Time | Last time this row in the table was updated. |

The Episode Table

The Episode table in the EPG database describes each television program episode. The following table briefly describes the fields in the Episode table.

| Field | Key | Index | Type | Description |
|---|---|---|---|---|
| Episode ID | P | Yes | Counter | Internally generated unique identifier for this episode. |
| Title | E | Yes | Text | Program title ("Frontline") |
| Description | | No | Text | Extended description of this episode ("Mail order diplomas investigated") |
| Attachment | | No | Memo | URL or application associated with this episode. |
| Display Mask | | No | Integer | Bitmask used with the conditional access mask to determine whether or not to display this episode. |
| Rating ID | F | No | Integer | Foreign key to the Rating table. |
| Genre ID | F | No | Integer | Foreign key to the Genre table. |
| Sub-Genre ID | F | No | Integer | Foreign key to the Sub-Genre table. |
| Last Update | | No | Date/Time | Last time this row in the table was updated. |

The Time Slot Table

The Time Slot table in the EPG database defines time slot and channel information for each episode. The following table briefly describes the fields in the Time Slot table:

| Field | Key | Index | Type | Description |
|---|---|---|---|---|
| Episode ID | PF | Yes | Integer | Foreign key to the Episode table. |
| Channel ID | PF | Yes | Integer | Foreign key to the Channel table. |
| Start Time | P | No | Time | Beginning time for this time slot. |
| End Time | P | No | Time | Ending time for this time slot. |
| Length | | No | Integer | Length of time slot in minutes. |
| Payment Address | | No | Integer | Address used to find pay-per-view information for this channel. Used with Payment Token to subscribe to the channel. |
| Payment Token | | No | Integer | Pay-per-view ID passed to the conditional access server to subscribe to this channel. |
| Last Update | | No | Date/Time | Last time this row in the table was updated. |

The Time Slot table is normalized into a separate table so pay-per-view movies can repeat for multiple shows on multiple channels from a single episode record.

The Rating and Rating System Tables

The Rating table in the EPG database defines rating name, for individual ratings used in various rating systems. The following table briefly describes the fields in the Rating table:

| Field | Key | Index | Type | Description |
|---|---|---|---|---|
| Rating ID | P | Yes | Counter | Unique identifier for this rating. |
| Rating System ID | F | Yes | Integer | ID for the rating system using this rating entry. |
| Rating | | Yes | Float | Numerical value used to rank this rating in the rating system. |
| Description | | No | Text | Name of this rating ("PG-13, etc). |

The Rating System table in the EPG database provides names for MPAA style names. The following table briefly describes the fields in the Rating System table:

| Field | Key | Index | Type | Description |
|---|---|---|---|---|
| Rating System ID | P | Yes | Counter | Unique ID for this rating system. |
| Turning Space | | Yes | Integer | Network defining this rating system. Identifies which loader handles the data. |
| Name | | Yes | Text | Name of this rating system ("MPAA", etc). |
| Description | | No | Text | Description of this rating system. |

The Genre and Sub-Genre Tables

The Genre table in the EPG database provides names for categories of episodes. The following table briefly describes the fields in the Genre table:

| Field | Key | Index | Type | Description |
|---|---|---|---|---|
| Genre ID | P | Yes | Counter | Unique identifier for this genre. |
| Tuning Space | | Yes | Integer | Network which defines this genre. Identifies which loader handles the data. |
| Name | | Yes | Text | Name of this genre ("Movies", "TV Series", etc). |

The Sub-Genre table in the EPG database provides names for sub-categories within a genre. The following table briefly describes the fields in the Sub-Genre table:

| Field | Key | Index | Type | Description |
|---|---|---|---|---|
| Sub Genre ID | P | Yes | Counter | Unique identifier for this sub-genre. |
| Genre ID | F | Yes | Integer | ID of the genre associated with this sub-genre. |
| Name | | Yes | Text | Name of this sub-genre ("Science Fiction", etc). |

The Broadcast Property Table

The Broadcast Property table in the EPG database gives names for various broadcast properties, such as closed-captioning. The following table briefly describes the fields in the Broadcast Property table:

| Field | Key | Index | Type | Description |
|---|---|---|---|---|
| Broadcast Property ID | P | Yes | Counter | Unique identifier for this table. |
| Tuning Space | | No | Integer | Tuning space to which the broadcast property belongs. |
| Abbreviation | | No | Text(4) | Short name for this property, restricted to 4 bytes in length ("CC", etc). |
| Name | | No | Text | Name of this property ("closed-captioned", etc). |
| Display Order | | No | Integer | Priority of item when there isn't room to display all properties. |
| Pictogram Moniker | | No | Text | File name of the bitmap associated with this property. |

The Episode Property Table

The Episode Property table in the EPG database specifies properties associated with individual episodes. The following table briefly describes the fields in the Episode Property table:

| Field | Key | Index | Type | Description |
|---|---|---|---|---|
| Episode ID | F | Yes | Integer | Foreign key to the Episode table. |
| Broadcast Property ID | F | Yes | Integer | Foreign key to the Broadcast Property table. |

The Channel Property Table

The Channel Property table in the EPG database specifies properties associated with individual channels. The following table briefly describes the fields in the Channel Property table:

| Field | Key | Index | Type | Description |
|---|---|---|---|---|
| Channel ID | P | Yes | Integer | Foreign key to the Channel table. |
| Broadcast Property ID | P | Yes | Integer | Foreign key to the Broadcast Property table. |

The Stream Type Table

The Stream Type table in the EPG database gives names for all data streams available on a specific channel. The following table briefly describes the fields in the Stream Type table:

| Field | Key | Index | Type | Description |
|---|---|---|---|---|
| Stream Type ID | P | Yes | Counter | Unique identifier for this stream type table. |
| Tuning Space | | Yes | Integer | Network which defines this stream. |
| Value | | Yes | Integer | Ordinal to pass to driver when requesting a specific video stream. |
| Description | | No | Memo | Name of this stream ("Video", "Data", etc). |

The Channel Stream Table

The Channel Stream table in the EPG database lists the data streams available on a specific channel. The following table briefly describes the fields in the Channel Stream table:

| Field | Key | Index | Type | Description |
|---|---|---|---|---|
| Channel ID | P | Yes | Integer | Channel ID for this stream. |
| Stream Type ID | P | Yes | Integer | Stream type ID for this stream. |
| SubChannel | P | Yes | Integer | Subchannel number used to identify this stream relative to the channel. |
| Name | | No | Memo | Description of the stream |

In addition to these tables, the system maintains information relating to each tuning space, such as a short user name for the tuning space, a description of the tuning space for display to the user, a unique identifier corresponding to the tuning space, and the minimum and maximum channel numbers for the tuning space.

While the invention has been described primarily in terms of its features, the invention also includes methodological steps of selecting content from a plurality of different physical sources and from a variety of content sources that are available from the physical sources. The invention further includes computer-readable storage media having computer-executable instructions for performing said methodological steps.

Steps in accordance with the invention include obtaining data for a plurality of different content sources in a variety of data formats, and translating the content data into an integrated database having a predefined schema. A further step comprises composing an integrated listing of content entries based upon the integrated database.

Other steps in accordance with the invention include displaying the integrated listing of content entries for selection by a user, wherein each content entry is associated with and identifies both a content source and a physical source from which particular content is available. Further steps include accepting a selection from the user of a single content entry and, in response, rendering the content source identified by the selected single content entry from the physical source that is also identified by the selected single content entry. As already discussed, the content sources will often be traditional broadcast channels.

The rendering step preferably comprises tuning a tuner or other video receiver to the selected broadcast channel. The rendering step might be performed in other ways, however, such as by retrieving data from some type of data storage and rendering it in a bit-mapped graphics display, or by writing a broadcast stream to a storage medium such as an analog or digital videotape or other digital medium, with or without a visible display at that particular time.

The invention greatly simplifies the presentation of programming information to a user. The integrated listing of programs, regardless of their signal source, allows users to concentrate on more relevant matters that relate directly to their choice of preferred audio-visual material, rather than on physical details of the receiving apparatus.

Another advantage of this scheme is that channel blocking, for parental controls, can be easily implemented, since channel selection is integrated with a database describing program content. For example, the channel selection logic can block any channels having current programming that is rated "R".

In compliance with the statute, the invention has been described in language more or less specific as to structural and methodical features. It is to be understood, however, that the invention is not limited to the specific features described, since the means herein disclosed comprise preferred ft)rms of putting the invention into effect. The invention is, therefore, claimed in any of its forms or modifications within the proper scope of the appended claims appropriately interpreted in accordance with the doctrine of equivalents.

We claim:

1. A universal entertainment system comprising:
   a video receiver that receives a plurality of content sources from a plurality of different physical signal sources, the content sources having corresponding content data;
   an automated program guide that operates in conjunction with the video receiver to translate the content data to a predefined interface schema;
   the automated program guide being configured to present an integrated listing of program entries that are available from the signal sources and their content sources in the predefined interface schema, wherein each program entry is associated with both a signal source and a content source that is available from said signal source;
   wherein the automated program guide accepts a selection from the user of a single program entry and in response tunes the video receiver to the signal source associated with the selected single program entry and to the content source associated with the selected single program entry.

2. An entertainment system as recited in claim 1, wherein:
   the automated program guide identifies broadcast channels by channel indicators;
   broadcast channels having the same channel indicators are available from different signal sources.

3. An entertainment system as recited in claim 1, wherein:
   the automated program guide identifies broadcast channels by channel numbers;
   broadcast channels having the same channel numbers are available from different signal sources.

4. An entertainment system as recited in claim 1, wherein each signal source comprises a different physical receiving apparatus.

5. An entertainment system as recited in claim 1, wherein one signal source comprises an antenna and another signal source comprises a subscription television cable.

6. An entertainment system as recited in claim 1, wherein the signal sources comprise different subscription television cables.

7. A universal automated program guide that operates in conjunction with a rendering system that can receive and render content from a plurality of different physical sources and from a variety of content sources that are available from the physical sources, the automated program guide comprising:
   logic hardware configured to receive content data corresponding to the different content sources, to format the content data in accordance with a predefined interface schema, and to display an integrated listing of content entries that are available from the physical sources and their content sources in the predefined interface schema;
   wherein the content entries are associated with content sources and physical sources from which the content entries are available;
   the logic hardware being configured to accept a selection from the user of a single content entry;

the logic hardware being further configured to instruct the rendering system to render the content source associated with the selected single content entry from the physical source that is also associated with the selected single content entry.

8. An automated program guide as recited in claim 7 wherein the content sources comprise broadcast channels.

9. An automated program guide as recited in claim 7 wherein at least some of the content sources comprise Internet content.

10. An automated program guide as recited in claim 7 wherein:
the automated program guide identifies content sources by channel numbers;
broadcast channels having the same channel numbers are available from different physical sources.

11. An automated program guide as recited in claim 7 wherein at least one of the physical sources comprises the Internet.

12. An automated program guide as recited in claim 7 wherein at least one of the physical sources comprises the Internet, and wherein at least some of the content sources comprise Internet content.

13. An automated program guide as recited in claim 7 wherein the physical sources comprise different transmission media.

14. An automated program guide as recited in claim 7 wherein the physical sources comprise different storage media.

15. An automated program guide as recited in claim 7 wherein the physical sources comprise different physical receiving apparatuses.

16. An automated program guide as recited in claim 7 wherein one physical source comprises an antenna and another physical source comprises a subscription television cable.

17. A universal entertainment system comprising:
a receiver that can receive content from a plurality of different physical sources and from a variety of content sources available from the physical sources, wherein the physical sources are identified by physical source identifiers and the content sources are identified by content source identifiers;
an automated program guide associated with the receiver that receives content data corresponding to the different content sources, formats the content data in accordance with a predefined interface schema, and presents an integrated listing of content entries for selection by a user in accordance with the predefined interface schema, wherein each content entry comprises a physical source identifier and a content source identifier from which particular content is available.

18. An entertainment system as recited in claim 17, wherein the automated program guide accepts a selection from the user of a single content entry and in response presents content from the physical source and content source identified by the selected source entry.

19. An entertainment system as recited in claim 17 wherein the content sources comprise broadcast channels.

20. An entertainment system as recited in claim 17 wherein the content sources comprise broadcast channels identified by channel numbers, and wherein broadcast channels having the same channel indicators are available from different physical sources.

21. An entertainment system as recited in claim 17 wherein the physical sources comprise different transmission media.

22. An entertainment system as recited in claim 17 wherein the physical sources comprise different storage media.

23. An entertainment system as recited in claim 17 wherein the physical sources comprise different physical receiving apparatuses.

24. An entertainment system as recited in claim 17 wherein at least some of the content sources comprise Internet content.

25. An entertainment system as recited in claim 17 wherein at least one of the physical sources comprises the Internet.

26. An entertainment system as recited in claim 17 wherein at least one of the physical sources comprises the Internet, and wherein at least some of the content sources comprise Internet content.

27. An entertainment system as recited in claim 17 wherein one physical source comprises an antenna and another physical source comprises a subscription television cable.

28. A method of selecting content from a plurality of different physical sources and from a variety of content sources that are available from the physical sources, comprising the following steps;
identifying content data corresponding to the variety of content sources:
formatting the content data in accordance with a predefined interface schema;
displaying an integrated listing of content entries for selection by a user in accordance with the predefined interface schema, wherein each content entry is associated with both a content source and a physical source from which particular content is available;
accepting a selection from the user of a single content entry;
in response to accepting a selection, rendering the content source associated with the selected single content entry from the physical source that is also associated with the selected single content entry.

29. A method as recited in claim 28, wherein the content sources comprise broadcast channels.

30. A method as recited in claim 28, wherein the rendering step comprises a step of tuning the tuner to a selected broadcast channel.

31. A method as recited in claim 28, wherein the content sources comprise broadcast channels identified by channel numbers, and wherein broadcast channels having the same channel indicators are available from different physical sources.

32. A method as recited in claim 28, wherein at least some of the content sources comprise Internet content.

33. A method as recited in claim 28, wherein at least one of the physical sources comprises the Internet.

34. A method as recited in claim 28, wherein at least one of the physical sources comprises the Internet, and wherein at least some of the content sources comprise Internet content.

35. A method as recited in claim 28, wherein the physical sources comprise different transmission media.

36. A method as recited in claim 28, wherein the physical sources comprise different storage media.

37. A method as recited in claim 28, wherein the physical sources comprise different physical receiving apparatuses.

38. A method as recited in claim 28, further comprising:
obtaining content data for a plurality of different content sources in a variety of data formats;

translating the content data into an integrated database having a predefined schema;

composing the integrated listing of content entries based upon the integrated database.

39. A computer-readable storage medium having computer-executable instructions for selecting content from a plurality of different physical sources and from a variety of content sources that are available from the physical sources, the instructions performing steps comprising:

identifying content data corresponding to the variety of content sources;

formatting the content data in accordance with a predefined interface schema;

displaying an integrated listing of content entries for selection by a user in accordance with the predefined interface schema, wherein each content entry is associated with both a content source and a physical source from which particular content is available;

accepting a selection from the user of a single content entry;

in response to accepting a selection, rendering the content source associated with the selected single content entry from the physical source that is also associated with the selected single content entry.

40. A computer-readable storage medium as recited in claim 39, wherein the rendering step comprises a step of tuning the tuner to a selected broadcast channel.

41. A method as recited in claim 39, further comprising:

obtaining content data for a plurality of different content sources in a variety of data formats;

translating the content data into an integrated database having a predefined schema;

composing the integrated listing of content entries based upon the integrated database.

* * * * *